US010919199B2

(12) United States Patent
Roeder

(10) Patent No.: US 10,919,199 B2
(45) Date of Patent: Feb. 16, 2021

(54) COMPOSITE COMPONENT AND METHOD FOR PRODUCING A COMPOSITE COMPONENT

(71) Applicant: OSRAM GmbH, Munich (DE)

(72) Inventor: Karl Roeder, Steinheim (DE)

(73) Assignee: OSRAM Beteiligungsverwaltung GmbH, Grünwald (DE)

( * ) Notice: Subject to any disclaimer, the term of this patent is extended or adjusted under 35 U.S.C. 154(b) by 339 days.

(21) Appl. No.: 15/742,053

(22) PCT Filed: Jun. 9, 2016

(86) PCT No.: PCT/EP2016/063098
§ 371 (c)(1),
(2) Date: Jan. 5, 2018

(87) PCT Pub. No.: WO2017/005449
PCT Pub. Date: Jan. 12, 2017

(65) Prior Publication Data
US 2018/0200934 A1   Jul. 19, 2018

(30) Foreign Application Priority Data

Jul. 7, 2015   (DE) ........................ 10 2015 212 692

(51) Int. Cl.
*B29C 45/16*   (2006.01)
*B29K 69/00*   (2006.01)
(Continued)

(52) U.S. Cl.
CPC .......... *B29C 45/16* (2013.01); *B29C 45/1615* (2013.01); *B29C 2045/169* (2013.01);
(Continued)

(58) Field of Classification Search
CPC ...... B29C 2045/169; B29C 2045/1693; B29C 2045/1696; B29C 45/16; B29C 45/1615;
(Continued)

(56) References Cited

U.S. PATENT DOCUMENTS 4,528,064 A * 7/1985 Ohsawa ............... H05K 3/4038
174/261
6,080,935 A * 6/2000 Lanoue ................. H01F 41/063
174/117 F
(Continued)

FOREIGN PATENT DOCUMENTS

DE   19638322 A1   3/1998
DE   19808178 A1   9/1998
(Continued)

OTHER PUBLICATIONS

German Examination Report based on application No. 10 2015 212 692.7 (5 pages) dated Feb. 22, 2016 (Reference Purpose Only).
International Search Report based on application No. PCT/EP2016/063098 (12 pages and 3 pages of English translation) dated Aug. 8, 2016 (Reference Purpose Only).
(Continued)

*Primary Examiner* — Matthew J Daniels
*Assistant Examiner* — Yunju Kim

(57) ABSTRACT

A composite component and methods for producing a composite component are described herein. In some aspects, a method for producing a composite component may include molding a body from a plastic material, such that the molded body has at least one recess arranged adjacent to at least one respective projection. This method may also include pressing the at least one respective projection such that the plastic material of the molded body is thereby displaced into an opening-side region of the at least one recess adjacent thereto. The method may further include introducing flowable filler material into the at least one recess and solidifying the filler material. The filler material may be an electrically conductive filler material.

14 Claims, 2 Drawing Sheets

(51) Int. Cl.
    *B29K 105/16*     (2006.01)
    *B29K 505/00*     (2006.01)
    *B29L 31/00*     (2006.01)

(52) U.S. Cl.
    CPC .......... *B29C 2045/1693* (2013.01); *B29C 2045/1696* (2013.01); *B29K 2069/00* (2013.01); *B29K 2105/16* (2013.01); *B29K 2505/00* (2013.01); *B29K 2905/00* (2013.01); *B29K 2995/0005* (2013.01); *B29L 2031/747* (2013.01)

(58) Field of Classification Search
    CPC .......... B29C 2045/14368; B29C 43/18; B29C 43/181; B29C 43/182; B29C 43/206; B29C 44/3215; B29C 53/02; B29C 53/36; B29C 53/38; B29C 53/083; B29C 43/00; B29K 2069/00; B29K 2105/16; B29K 2505/00; B29K 2905/00; B29K 2995/0005; B29L 2031/747; H05K 1/0272
See application file for complete search history.

(56) References Cited

U.S. PATENT DOCUMENTS

| | | |
|---|---|---|
| 2002/0043398 A1 | 4/2002 | Nakagawa et al. |
| 2003/0235698 A1 | 12/2003 | Singh |
| 2004/0003908 A1 | 1/2004 | Singh et al. |

FOREIGN PATENT DOCUMENTS

| | | |
|---|---|---|
| DE | 10329298 A1 | 1/2004 |
| JP | H11254485 A | 9/1999 |

OTHER PUBLICATIONS

Anonymous: "Integriertes Metall-Kunststoff-Spritzgießen Exzellenz durch Integration—Die kürzeste Prozesskette für Elektronikanwendungen", Oct. 18, 2012, 6 pages, Retrieved from the Internet: URL: http://www.ikv-aachen.de/fileadmin/ikv-uploads/Aktuelles-Presse/Veranstaltungen_pdf/IKV_Projekt_IMKS_Fakuma_2012.pdf [retrieved on Jul. 28, 2016].

* cited by examiner

COMPOSITE COMPONENT AND METHOD FOR PRODUCING A COMPOSITE COMPONENT

CROSS-REFERENCE TO RELATED APPLICATIONS

This application is a national stage entry of International Application No. PCT/EP2016/063098 under 35 U.S.C. §§ 365 and 371, filed on Jun. 9, 2016, which claims priority to German Patent Application No. 10 2015 212 692.7, which was filed on Jul. 7, 2015. The disclosures of each of the foregoing documents are incorporated herein by reference in their entirety and for all purposes.

FIELD

The present disclosure relates to a method for producing a composite component from a plastic material and an electrically conductive filler material, wherein the method involves at least the following steps: molding a molded body from the plastic material, which molded body has at least one recess; and introducing flowable filler material into at least one recess and solidifying the filler material. The present disclosure also relates to a composite component made from plastic and electrically conductive filler material which has been produced according to the method. The present disclosure is applicable in particular to a lighting device, e.g., with at least one plastic/metal composite component.

BACKGROUND

From an informational brochure "Integrated metal/plastic injection molding" of the Institute for Plastics Processing in Industry and Handicrafts at the RWTH of Aachen there is known a combination of plastic injection molding and metal die-casting to form a multi-material process. In order to be able to inject conductor track structures onto a plastic substrate in an injection molding machine, an auxiliary unit has been developed borrowing from hot chamber die-casting of metals, making possible the processing of low-melting metal alloys based on tin, silver and copper. For this, the metal is supplied to the injection unit in the fluid state. Furthermore, small amounts of the easily flowing or low-viscosity metal alloy can be processed in a reproducible and sprue-less manner.

However, the drawback here is that, due to a large cross section area of the conductor tracks, a large material input is required for long conduits. Furthermore, the possible length of the conductor track thus far is limited to around 500 millimeters (mm), since after introducing the molten metal alloys into corresponding recesses or cavity or cavities in the injection molded plastic body there is a distinct loss of heat across the die covering the recesses or cavities. Furthermore, a loosening of the metal from the cavity might occur under a rather large mechanical stress (such as shaking) of the finished composite component, which can be prevented, e.g., by a costly additional overmolding of the composite component. Furthermore, the fabrication expense for a sealing of the low-viscosity metal alloy during the metal die-casting is high.

SUMMARY

The problem which the present disclosure proposes to solve is to overcome at least partly the drawbacks of the prior art.

This problem is solved according to the features of the present disclosure. In particular, advantageous embodiments will be found in the present disclosure.

The problem is solved by a method for producing a composite component from a plastic material and an electrically conductive filler material, wherein the method involves at least the following steps: molding a molded body from the plastic material, which molded body has at least one recess, which is arranged adjacent to at least one projection; pressing the at least one projection so that plastic material is thereby displaced into an opening-side region of the adjacent recess; and introducing flowable filler material into at least one recess and solidifying the filler material.

This method has the advantage that the plastic material displaced into the recess constitutes a barrier between the filler material located in the recess and a die situated on the outside. In this way, the flow of heat from the filler material to the die is lessened, so that the flowability of the filler material is assured for a longer length of time, which in turn enables the creation of longer conductor tracks in a simple manner, in particular tracks of more than 500 mm. Furthermore, the plastic material displaced into the recess reduces the cross section of the recess, so that conductor tracks with a reduced cross section area can be produced, which lowers the material input. Furthermore, the fabrication expense for a sealing of the filler material is lower or even negligible. The plastic material displaced into the recess furthermore has the effect that the filler material engages with the recess and is thereby held in the recess (with "form fitting"). Thus, an additional overmolding can be avoided. Another benefit is that the plastic material displaced into the recess can serve as protection, e.g., against a mechanical and/or chemical stress and/or as contact protection.

The electrically conductive filler material may be, for example a plastic (e.g., reinforced with carbon nanotubes (CNT) fibers) or a metal.

The recess may also be called a cavity and serves to accommodate the filler material.

That the plastic material is displaced into an opening-side region of the adjacent recess includes in particular the fact that this reduces the cross section area of the recess in the region of its opening or mouth. On the other hand, the cross section changes not at all, in particular, or only slightly at and in the vicinity of its bottom. Thus, the displaced plastic material acts as a complete or partial seal for the recess and consequently also for the filler material located therein.

That the filler material is flowable may include the fact that it has a base material which is not yet hardened or not yet strongly hardened during the filling process, for example, a curable elastomer mixture. The solidifying then corresponds to a curing.

Alternatively, the filler material may find itself in a molten state during the filling. The solidifying then corresponds to a congealing.

In particular, at least one recess may be an oblong recess, e.g., in the form of an elongated groove or a gutter. This enables the formation of a conductor track in the recess.

In one embodiment at least one recess passes directly into the at least one projection. This affords the benefit that an strong displacement of plastic into the recess occurs, corresponding to the volume of the projection.

But the adjacent arrangement of the projection may also mean that the projection has a spacing from the recess (i.e., from its mouth edge). This yields the possibility of displacing the plastic more uniformly into the recess along its depth.

In one modification, the projection is pressed so much that the surface associated with the projection and projected in the pressing direction adjoins the surrounding surface in flush manner. Thus, in particular, the material of the projection can be pressed so much that it no longer sticks out.

In yet another embodiment at least one recess has a respective projection at two opposite edges for at least a portion. In this way, a uniform two-sided displacement of the plastic into the recess can be achieved.

In one modification, only one projection is arranged or present on at least one section of at least one recess.

In another embodiment, the plastic material displaced into the recess closes the recess. The closing has the effect that the recess contains a cavity in respect of its cross section, which can be filled with the filler material. This affords the benefit that no further sealing of the recess is required, e.g., to prevent a flowing out of the still fluid filler material. Also in this case there is an effective thermal barrier between the die and the filler material.

In yet another embodiment, the projections extend over the entire length of at least one recess. In this way, an uninterrupted closing or partial closing of the recess can be achieved.

In another embodiment, several projections spaced apart from each other are distributed along the recess. Plastic material can be economized in this way. Also the accessibility of the filler material is improved in this way. For example, the projections may be arranged as a row of short projections (e.g., projections in the shape of a spherical cap).

Moreover, in one embodiment the pressing is performed by means of a heated die. In this way, the pressing and displacing of the projections can be done with slight force and under slight stresses in the molded body.

In one embodiment advantageous for an simple production, the formed molded body is turned over onto another die for the pressing.

In one modification, the plastic material is a plastic capable of injection molding, such as a thermoplastic, thermosetting, or elastomer plastic. Thus, as thermoplastic plastics, one may use for example acrylonitrile-butadiene-styrene (ABS), polyamides (PA), polylactate (PLA), polymethylmethacrylate (PMMA), polyethylene terephthalate (PET), polyethylene (PE), polypropylene (PP), polystyrene (PS), polyetheretherketone (PEEK), polyvinylchloride (PVC) etc. or mixtures thereof.

In one advantageous embodiment, the plastic material includes or is polycarbonate (PC), since polycarbonate among other things is economical and has a high strength, impact toughness, rigidity and hardness. Furthermore, polycarbonates are good insulators against electric current.

The plastic material may generally be a single plastic (such as polycarbonate) or a mixture of several plastics (e.g., PC/ABS). The plastic material may also be called "plastic" in general.

In an embodiment which is easy to process, the filler material is a low-melting metal alloy, e.g., one based on tin, silver, and/or copper. However, the filler material may also be another metal, metal mixture, or alloy. Metals generally have the advantage of having a high electrical conductivity.

The introducing of the filler material may be done in particular by a metal die-casting.

The problem is also solved by a composite component made from plastic and electrically conductive filler material, wherein the composite component has been produced as described above. The composite component has the same advantages as the method and can be embodied in similar manner.

In one embodiment, the composite component is a lighting device or a part thereof. The lighting device may be, e.g., a module, a lamp, a light, a lighting system, and so forth.

BRIEF DESCRIPTION OF DRAWINGS

The abovedescribed properties, features and advantages of the present disclosure as well as the manner of achieving them will become more clear and understandable in connection with the following description of a sample embodiment, which will be explained more closely in connection with the drawings. For clarity, the same or similar elements shall be given the same reference numbers.

DETAILED DESCRIPTION

Figure 1:
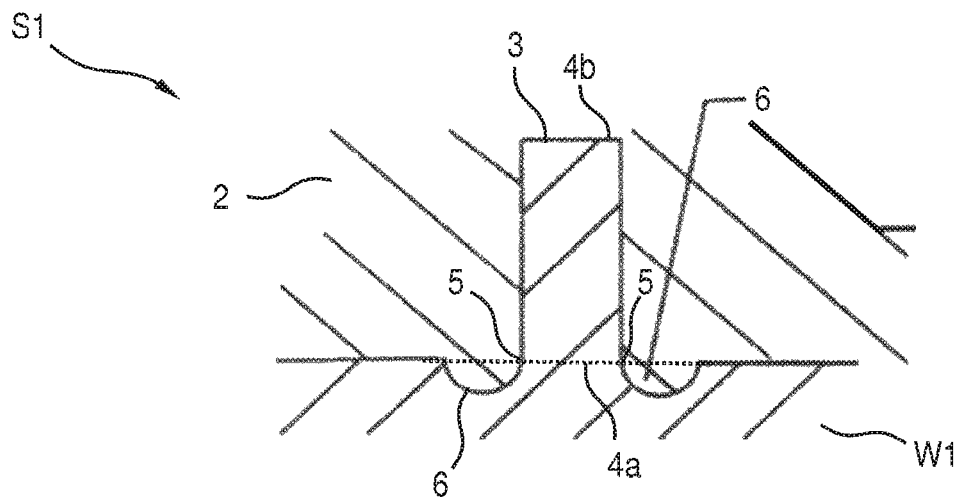
FIGS. 1 to 3 show, in cross section views, the steps of a method of production according to the present disclosure.

FIG. 1 shows, in a cross section view, a first step S1 of a method for producing a composite component 1 (see FIG. 3), where corresponding components are represented only for a portion.

In step S1, a molded body 2 is formed from plastic—e.g., here polycarbonate—advantageously by injection molding by means of a first ("casting") die W1 as a casting mold. This forming is easy, since the molded body 2 can be a simple impression of the first die W1.

The molded body 2 so produced has here at least one recess 3, having for example a rectangular cross section shape. In its lengthwise direction (perpendicular to the plane of the drawing), the recess 3 is oblong in shape, for example, and may then be viewed as or termed a gutter or a longitudinal groove. The recess 3 is represented in FIG. 1 and FIG. 2 with a downwardly directed mouth opening 4a, while the bottom or floor 4b is represented above it.

The recess 3 passes from the mouth opening 4a or from its two side edges 5 directly into a respective projection 6. The two (here, downwardly directed) projections 6 extend to the front beyond the mouth opening 4a. Alternatively, however, the projections 6 could also be arranged spaced away or set off from the side edges 5 (not shown).

The projections 6 may extend over the entire length (perpendicular to the plane of the drawing) of the recess 3. Alternatively, several projections 6 which are locally bounded in the longitudinal direction may be distributed at a spacing from each other along the recess 3. The projections 6 here, purely as an example, have a cross section shape of a spherical cap.

Figure 2:
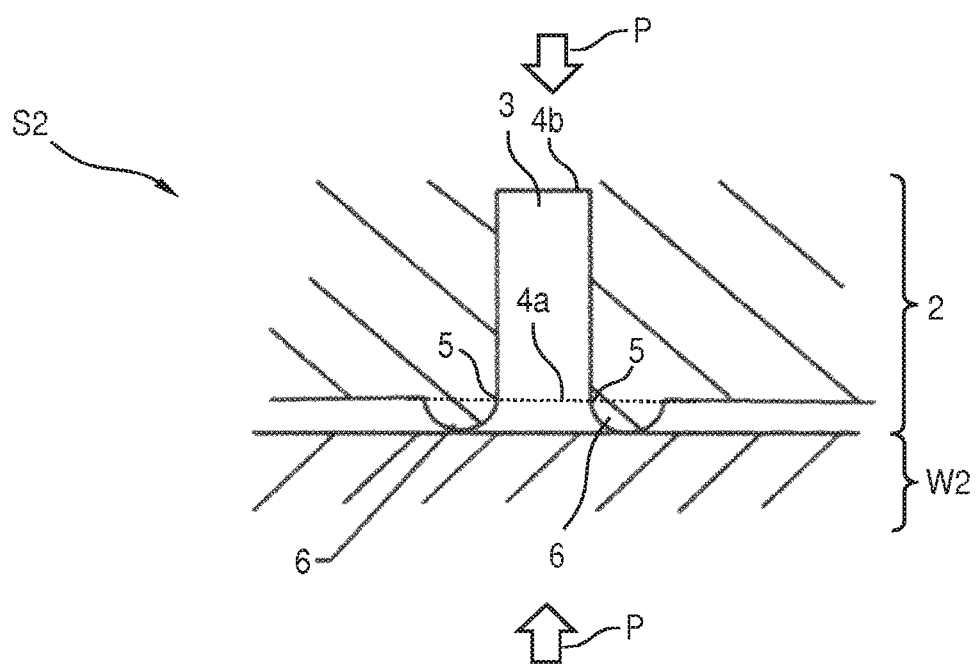

FIG. 2 shows, in a cross section view, a second step S2 of the method for producing the composite component 1, where corresponding components are represented only for a portion.

A change of dies has now been performed from the casting die W1 to a second ("pressing") die W2. The change of dies may be done in the course of an ongoing production sequence. Alternatively, the molded body 2 can be prefabricated and supplied as a semifinished piece to a further processing sequence.

The pressing die W2 is designed to be pressed against the projections 6 of the molded body 2, as indicated by the two arrows P, thereby leveling out the projections 6. So as not to place the molded body 2 under high stress, the pressing die W2 is heatable, so that the projections 6 can be locally plasticized by heat transfer (e.g., if the plastic is a thermoplastic).

By step S2, material of the molded body 2 is displaced into an opening-side partial region 3a of the recess 3, i.e., into a front region 3a of the recess 3 emerging from the original mouth opening 4a. This is shown in FIG. 3, which will be described more closely below.

Figure 3:
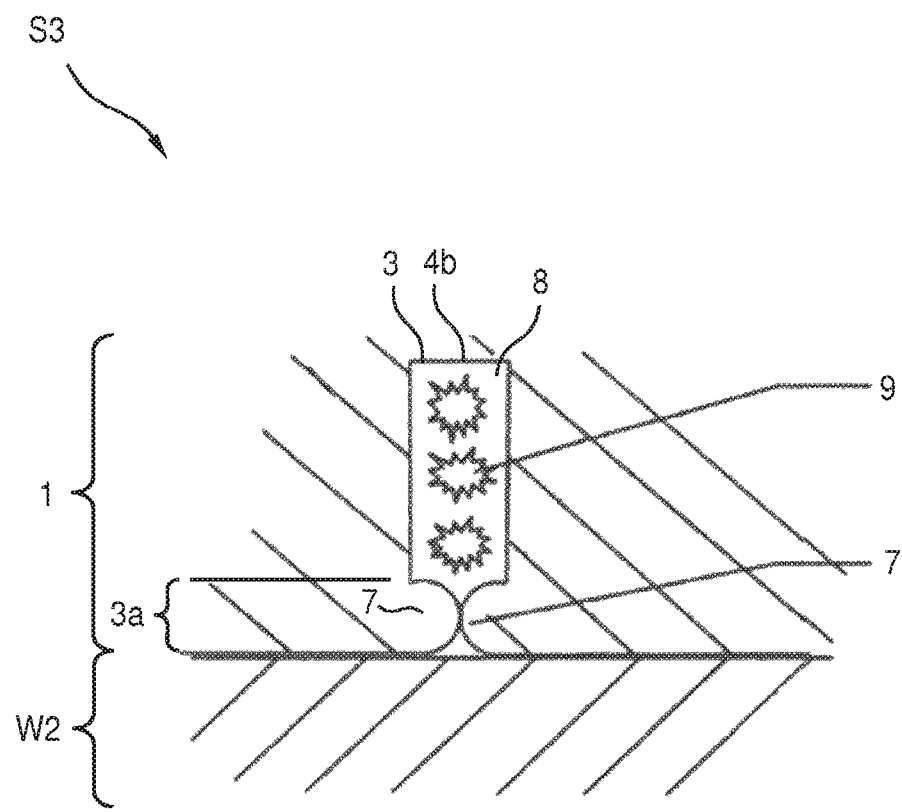

FIG. 3 shows that, thanks to the pressing in step S2, a volume of the molded body 2 roughly corresponding at least to the volume of the projections 6 has been displaced into the opening-side partial region 3a of the original recess 3. At least a portion of the material of the projections 6 can have been displaced into the opening-side partial region 3a in this process. The displaced material forms sealing lips 7, which extend from both sides into the recess 3. In the sample embodiment shown, the two sealing lips 7 abut against each other, so that they close off the recess 3 in the opening-side partial region 3a. In this way, a cavity 8 is created in the recess 3, into which in a third step S3 flowable filler material in the form of a molten metal alloy 9 based on tin, silver, and/or copper is introduced. This may occur, e.g., by a metal die-casting. Since the metal alloy 9 is separated by the two sealing lips 7 from the second die W2, the dissipation of heat from the metal alloy 9 is only slight, so that it can flow for an long length before hardening. The closed sealing lips 7 also prevent an emergence of the molten metal alloy 9 from the cavity 8, which significantly facilitates the handling.

After the metal alloy 9 has hardened in the cavity 8, the composite component 1 so created can be removed and/or processed further. For example, the metal alloy 9 can be used as a conductor track. The sealing lips 7 afford the further advantage of protecting the metal alloy 9 and moreover making possible a contact safety.

The composite component 1 can be used for example as a lighting device or as a part thereof.

Although the present disclosure has been described and illustrated more closely in detail by the sample embodiments shown, the present disclosure is not limited to them and other variations may be inferred by the skilled person, without leaving the scope of protection of the present disclosure. Thus, a cross section shape of the recess may also have a different shape, such as a triangular shape.

Moreover, instead of two sealing lips there may also be present only one sealing lip.

Furthermore, the recess need not be closed by the sealing lip(s).

In general, a singular or a plural number may be understood by "a", "an", etc., especially in the sense of "at least one" or "one or more" and so forth, as long as this is not explicitly ruled out, e.g., by the phrase "precisely one" etc.

A number indication may also encompass precisely the indicated number as well as a customary tolerance range, as long as this is not explicitly ruled out.

REFERENCES

1 Composite component
2 Molded body
3 Recess
4 Mouth opening
5 Side edge
6 Projection
7 Sealing lip
8 Cavity
9 Metal alloy
P Arrow
S1 First step of method
S2 Second step of method
S3 Third step of method
W1 First die
W2 Second die

The invention claimed is:

1. A method for producing a composite component, the method comprising:
    molding a body from a plastic material, such that the molded body has at least one recess arranged adjacent to at least one respective projection;
    pressing the at least one respective projection such that the plastic material of the molded body is thereby displaced into and closes off, as seen in cross-sectional view, an opening-side region of the at least one recess adjacent thereto; and
    introducing flowable filler material into the at least one recess and solidifying the filler material,
    wherein the filler material is an electrically conductive filler material.

2. The method as claimed in claim 1,
    wherein said pressing the at least one respective projection comprises:
        pressing the at least one respective projection, such that the at least one respective projection passes directly into the at least one recess adjacent thereto.

3. The method as claimed in claim 1,
    wherein said molding a body from a plastic material comprises:
        molding the body from the plastic material, such that the at least one respective projection includes a respective projection at two opposite edges of the molded body.

4. The method as claimed in claim 1,
    wherein said pressing the at least one respective projection comprises:
        pressing the at least one respective projection, such that the plastic material displaced into the opening-side region of the at least one recess closes the at least one recess.

5. The method as claimed in claim 3,
    wherein said pressing the at least one respective projection comprises:
        pressing the at least one respective projection, such that the respective projections extend over an entire length of the at least one recess adjacent thereto.

6. The method as claimed in claim 1,
    wherein said molding a body from a plastic material comprises:
        molding the body from the plastic material, such that several projections spaced apart from each other are distributed along the at least one recess.

7. The method as claimed in claim 1,
    wherein said pressing the at least one respective projection includes:
        pressing the at least one respective projection by a heated die.

8. The method as claimed in claim 1, further comprising:
    transferring the molded body to another die prior to said pressing.

9. The method as claimed in claim 1,
    wherein the plastic material of the molded body comprises polycarbonate.

10. The method as claimed in claim 1,
    wherein the filler material is a low-melting metal alloy.

11. The method as claimed in claim 1,
    wherein said molding a body from a plastic material comprises:
        molding the body from the plastic material, such that the at least one respective projection has a cross-sectional shape of a spherical cap.

12. A method for producing a composite component, the method comprising:
- providing a prefabricated body of a plastic material, the prefabricated body having at least one recess arranged adjacent to at least one respective projection;
- pressing the at least one respective projection such that the plastic material of the molded body is thereby displaced into and closes off, as seen in cross-sectional view, an opening-side region of the at least one recess adjacent thereto; and
- introducing flowable filler material into the at least one recess and solidifying the filler material,
- wherein the filler material is an electrically conductive filler material.

13. A method for producing a composite component, the method comprising:
- molding a body (2) from a plastics material, such that the molded body (2) has at least one recess (3) arranged adjacent to at least one respective projection (6);
- pressing the at least one respective projection (6);
- displacing the plastics material of the at least one respective projection (6) into an opening-side region (3a) of the at least one recess (3) adjacent thereto; and
- subsequent to the displacing the plastics material of the at least one respective projection (6), then flowing molten electrically-conductive filler material (9) into the at least one recess (3) and solidifying the filler material (9).

14. The method of claim 13, wherein
- the displacing the plastics material further comprises closing off, as seen in cross-sectional view, the opening-side region of the at least one recess.

* * * * *